United States Patent
Munk

(10) Patent No.: US 6,880,783 B2
(45) Date of Patent: Apr. 19, 2005

(54) HYBRID AIR VEHICLE HAVING AIR CUSHION LANDING GEAR

(76) Inventor: Jeffery Roger Munk, Rectory Cottage, The Green Hardwick, Aylesbury, Buckinghamshire HP22 4UD (GB)

( * ) Notice: Subject to any disclaimer, the term of this patent is extended or adjusted under 35 U.S.C. 154(b) by 0 days.

(21) Appl. No.: 10/175,237

(22) Filed: Jun. 18, 2002

(65) Prior Publication Data

US 2003/0001044 A1 Jan. 2, 2003

Related U.S. Application Data

(63) Continuation of application No. 09/588,154, filed on Jun. 5, 2000, now abandoned.

(51) Int. Cl.$^7$ ................................................ B64B 1/20
(52) U.S. Cl. ........................ 244/25; 244/100 A; 244/30
(58) Field of Search ............................... 244/24, 25, 5, 244/35 R, 36, 100 A, 97, 30

(56) References Cited

U.S. PATENT DOCUMENTS

| | | | |
|---|---|---|---|
| 1,686,130 A | * | 10/1928 | Hall |
| 2,091,580 A | * | 8/1937 | Belinski |
| 3,180,588 A | * | 4/1965 | Fitzpatrick |
| 3,486,719 A | * | 12/1969 | Fitzpatrick et al. |
| 3,738,597 A | * | 6/1973 | Desmond et al. |
| 3,790,110 A | * | 2/1974 | Desmond |
| 3,844,509 A | * | 10/1974 | Jenkins |
| 4,298,175 A | * | 11/1981 | Desmond |
| 5,383,627 A | * | 1/1995 | Bundo |
| 5,622,133 A | * | 4/1997 | Sinitsyn et al. |
| 5,823,468 A | * | 10/1998 | Bothe |
| 6,196,498 B1 | * | 3/2001 | Eichstedt et al. |

FOREIGN PATENT DOCUMENTS

GB 768219 * 2/1957 ................ 244/5

* cited by examiner

*Primary Examiner*—Tien Dinh
(74) *Attorney, Agent, or Firm*—Galgano & Burke, LLP

(57) ABSTRACT

A hybrid air vehicle having a gas-filled contoured flattened hull including a pair of longitudinally extending side lobes defining, on the underside of the hull, a longitudinally extending central recess, a payload module received in the central recess and air cushion landing gear units on the underside of the side lobes of the hull. The landing gear units are spaced apart on either side of the payload module. The hybrid air vehicle has characteristics of an airplane, a lighter-than-air airship and a hovercraft.

13 Claims, 2 Drawing Sheets

HYBRID AIR VEHICLE HAVING AIR CUSHION LANDING GEAR

This application is a continuation of U.S. application Ser. No.: 09/588,154 filed Jun. 5, 2000, now abandoned.

TECHNICAL FIELD

This invention relates to a hybrid air vehicle (HAV) and in particular to an air vehicle which combines characteristics of an airplane, a lighter-than-air airship and a hovercraft.

BACKGROUND ART

In the past, attempts have been made to provide aircraft with both aerodynamic and aerostatic lift. Thus rigid and non-rigid gas-filled airships, which are normally lighter-than-air, are capable of taking off even though overloaded to the point that they are heavier-than-air. Such air vehicles, however, have been generally in the form of prolate ellipsoids of approximately circular cross-section, and the aerodynamic lift imparted to such air vehicles is minimal when compared with a conventional airfoil with the same planform area.

Since the lift in conventional airships is primarily aerostatic brought about by the hull being filled with lighter than air gas, such as helium, their cargo-carrying capability is limited by the volume of the gas envelope, and the total lift at best corresponds to little more than the weight of the air displaced by the gas envelope. Furthermore, in conventional cargo-carrying airships problems are encountered in loading and unloading the cargo and of dispersing concentrated loads.

Lighter-than-air airships are incapable of taxiing on their landing fields, and take-off and landing procedures are consequently very comply, requiring costly equipment and large number of persons in ground crews. On the other hand, conventional cargo airplanes, while they are capable of taxiing, have high take-off and landing speeds.

In GB-A-1,245,432 there is disclosed an aircraft which takes advantage of both the lift provided by a lighter-than-air gas and aerodynamic lift. The aircraft has an enclosed aluminium hull containing a lighter-than-air gas and which is delta-shaped in plan form and has an ellipse-like cross-section throughout substantially all of its length. The delta wing shape and low aspect ratio of the design provides a high cargo capacity as well as good aerodynamic performance. The aluminium hull is inflated with helium and cargo and fuel compartments are provided inside the hull suspended by numerous high-strength steel cables which distribute the concentrated load of the cargo and fuel compartments over the large area of the upper shell of the body. The propulsion system in arranged at the rear of the aircraft so that the propulsion system is effectively behind the drag producing system. As a result, the momentum loss of the flow due to the deceleration of the drag system is compensated by the accelerating action of the propulsion system, thus restoring the original velocity of the air with respect to the aircraft. Because of its excess gross weight, and because it is provided with landing gear, the aircraft is capable or taxiing on the ground in the same manner as a conventional multi-engine aircraft.

The aircraft described in GB-A-1,245,432 is more akin in design to an airplane than to an airship, the majority of the lift being provided by the aerodynamic delta shape of the hull. The hull is formed as a rigid framework of aluminium panels and the load compartment is housed within the hull. The width of the aircraft at its stern is about 75% of the length of the aircraft. Thus for an aircraft having a length of about 305 m, the width at the stern of the aircraft will be about 230 m. This places severe limitations where the aircraft can take off and land because of the need to have a flat runway capable of catering for such a wide aircraft.

DISCLOSURE OF INVENTION

An object of the present invention is to provide a hybrid air vehicle having characteristics of an airplane and a lighter-than-air airship. It is also an object of the invention for the air vehicle to have hovercraft-type air cushion landing gear units.

Another object of the invention is to provide a hybrid air vehicle having a relatively low height, contoured gas-filled hull.

A further object of the invention is to provide a hybrid air vehicle having a non-rigid contoured hull which preferably has a contour along its length.

According to the present invention there is provided a hybrid air vehicle having a gas-filled contoured flattened hull and including a pair of longitudinally extending side lobes defining, on the underside of the hull, a longitudinally extending central recess, a payload module received in said central recess and air cushion landing gear units on the underside of said side lobes of the hull, the landing gear units being spaced apart on either side of the payload module.

Suitably the air vehicle combines features or characteristics of an airplane, a lighter-than-air airship and a hovercraft. Ideally the air vehicle will generate approximately one-quarter to one half of its lift aerodynamically through its lifting-body shape and approximately one half to three-quarters through the buoyancy of the gas, e.g. helium, of its gas-filled hull.

By providing the landing gear units on the underside of the hull side lobes, they can be relatively widely spaced apart to improve the stability of the air vehicle when on the ground and when landing and taking off. There are a number of advantages in the landing gear units being air cushion landing gear units. For instance, after the air vehicle lands and the air supply is turned off, or reversed, the air vehicle will be gently lowered down. By appropriate design, the payload module can be arranged to be lowered with the air vehicle so as to be in a position where cargo can be easily off-loaded from a ramp of the payload module. With air cushion landing units, there is not the need to have perfectly flat runways for the air vehicle to land and take-off. Thus the air vehicle can land on any reasonably flat surface, even on water.

Each air cushion landing gear unit suitably comprises flexible curtain meant surrounding an air cushion cavity and air means for supplying compressed air to the air cushion cavity to provide a cushion of air for supporting the air vehicle during landing and take-off. Preferably each air cushion landing gear unit includes means for rapidly exhausting air From the air cushion cavity to provide a hold-down force for holding the air vehicle in position on the ground both for general mooring purposes and for compensating when the payload is being off-loaded.

In summary, therefore, the provision of widely spaced apart, inflatable air cushion landing gear units allows takeoff and landing on all reasonably flat surfaces, including raw land, swamps and water. On landing, the air cushion landing gear units, combined with the low profile of the hull, provide enhanced stability by means of sucking down (on ground) or flooding on-board tanks (on water) to aid loading and unloading of cargo without elaborate tie-down systems. In flight, the landing gear units are preferably retracted to improve aerodynamic lift of the hull.

The air vehicle is preferably of the non-rigid type comprising a flexible, pressure stabilised multi-hull construction. The multi-hull design provides both stability and manoeuvrability in flight. The low hull height relative to length, coupled with the air cushion landing gear units provides a high degree of stability on ground and ease of ground handling.

Conveniently the hull is prestressed and is made from flexible sheet material, e.g. a composite material or laminated fabric material, which provides a shell design tensioned by pressure. Thus the hull in suitably pressure-stabilised without the need for the use of internal structure bracing. This approach reduces the cost and weight of construction and provides resilience to the structural shell.

Suitably the hull includes a longitudinally extending top lobe arranged between the side lobes at the top of the hull. In this case the hull suitably has an outer envelope and a pair of internal longitudinally extending partition means which converge downwardly towards each other, the space between the partition means and the outer envelope defining the top lobe and the spaces outwardly of the partition means defining the side lobes. The underside of the hull in the longitudinal direction of the hull, at least in a central region where the payload module and landing gear units are mounted, in generally flatter than the top side of the hull in the longitudinal direction.

The hull lobes are gas-filled, typically with helium, and are isolated from the other hull lobe(s). Each hull lobe may be compartmented along its length—i.e. each hull lobe may comprise separate compartments separated from each other by partitions which allow flow of gas therebetween. The formation of multiple lobes of helium bags is for safety/redundancy purposes. Catenary webs are suitably provided for carrying loads between the cargo module floor and the outer shell.

Conveniently the two side hull lobes extend rearwardly further than the top hull lobe and are provided with stern mounted drive motors. These propulsion units operate in the wake of the hull which confers improved propulsion efficiency and enables a more truncated (and hence a more helium lift efficient and more structurally efficient) shape to be used for the rear section of the hull.

Separate motor means are also conveniently provided on each side of the hull. The use of vectored thrust on at least some, preferably all, of the engines allows vertical thrust vectors to act through the center of gravity and center of pressure. Thus there is the facility for vertical take-off and landing (VTOL) and zero roll take-off and landing (ZTOL) together with generally improved control.

The hull is suitably provided with tail fins which are typically disposed at an angle to a vertical plane.

The hull is preferably made from flexible sheet material which is preferably a laminated fabric material. Preferably the material in cut into flat shapes which are joined together, e.g. by bonding, to form the correctly shaped hull.

The hull preferably has a camber along its length, this providing more efficient aerodynamic lift and also a flatter underside that gives a better interface to the ground for loading, off-loading, mounting of hover cushion units, etc.

BRIEF DESCRIPTION OF THE DRAWINGS

Embodiments of the invention will now be described, by way of example only, with particular reference to the accompanying schematic drawings, in which.

BEST MODE FOR CARRYING OUT THE INVENTION

Figure 1:
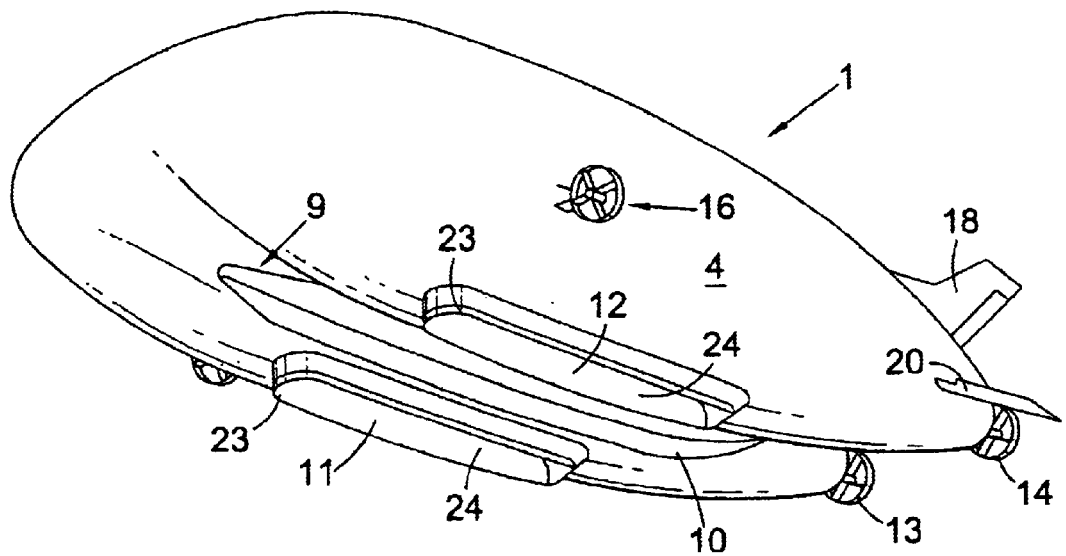
FIG. 1 is a view from below, from one side and from the front of an air vehicle according to the invention.
Figure 2:
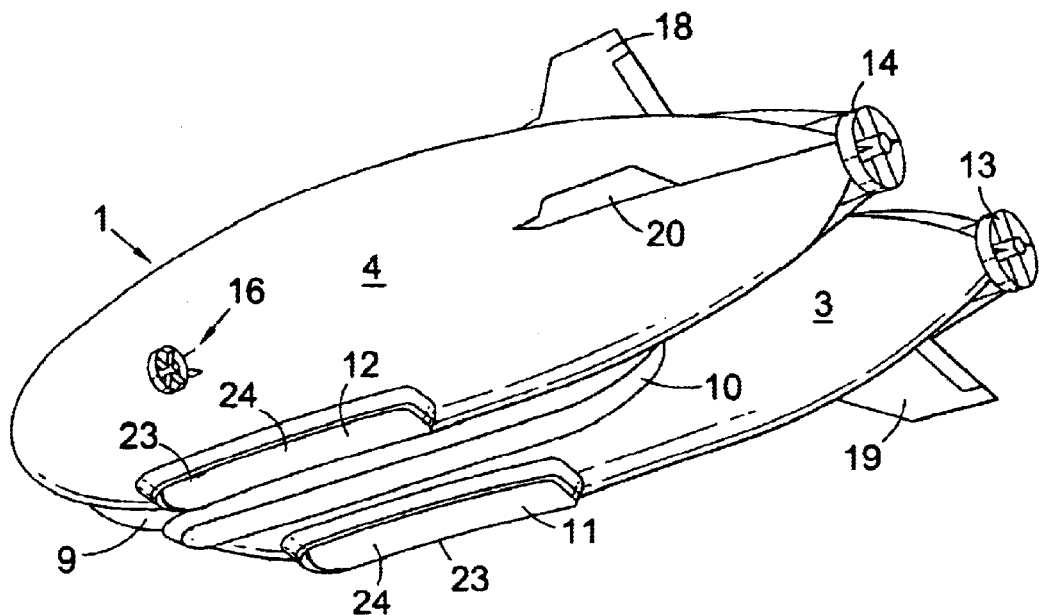
FIG. 2 is a view of the air vehicle shown in FIG. 1 as viewed from below, from one side and from the rear.
Figure 3:
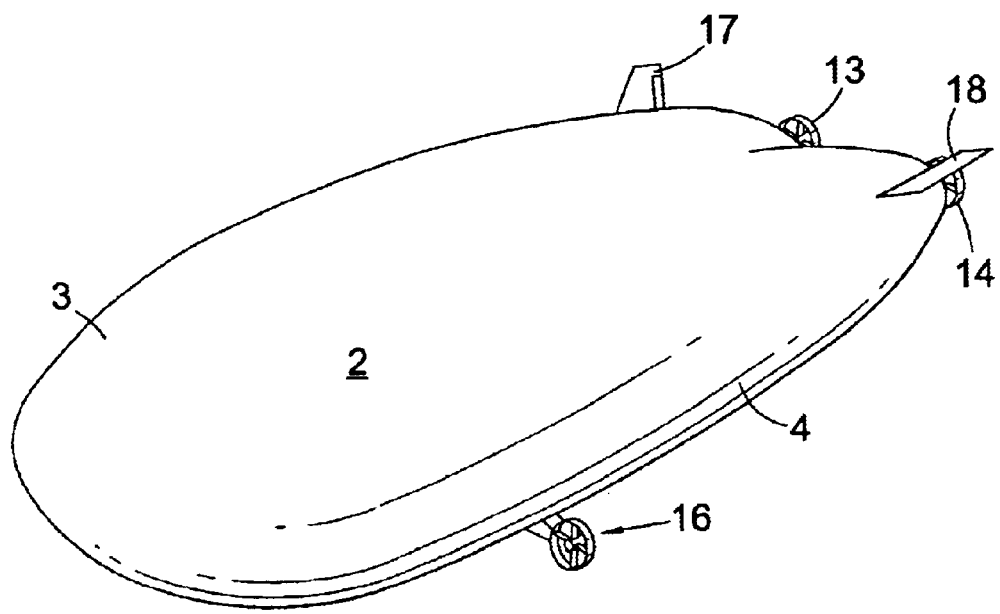
FIG. 3 is a view of the air vehicle shown in FIG. 1 as viewed from above, from one side and from the front.
Figure 4:
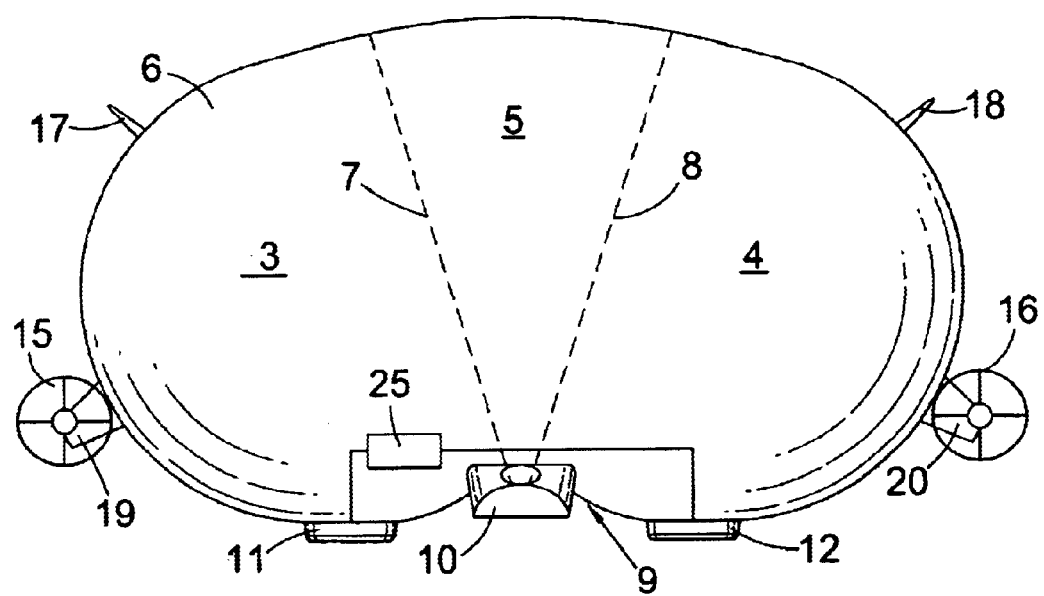
FIG. 4 is a view from the front of the air vehicle shown in FIG. 1.

FIGS. 1 to 4 show a pressure-stabilised, preferably non-rigid, air vehicle, generally designated by the reference numeral 1, laving a hull 2 with a flattened, generally elliptical cross-section throughout most of its length. The hull 2 is formed of two longitudinally extending side lobes 3 and 4 and a longitudinally extending top lobe 5 which does not extend rearwardly as far as the side lobes. The hull is made from reinforced sheet material, e.g. a high strength laminated fabric, and comprises an outer envelope 6 and inner, longitudinally extending partition walls 7 and 8 (see FIG. 4) extending between the top and bottom of the hull. The partition walls 7 and 8 converge downwardly towards each other and serve to define the side lobes 3 and 4 and the top lobe 5. Each hull lobe may include transverse partition walls at spaced apart positions along its length which may extend partly between the top and bottom walls or, alternatively, may have openings therein to permit the contained helium gas to pass, albeit in a restricted manner, between adjacent compartments.

The sheet material from which the hull is formed is cut into precise, flat shapes which are bonded together to provide the precise curved shape of the hull. When the lobes are filled with helium the pressure stabilised hull is formed having a camber along its length. The two side lobes 3 and 4 are in effect joined, or positioned close together, at the underside of the hull and define a central longitudinal concave surface or recess 9 along the length of the hull. The wedge shaped top lobe 5, which is positioned between the aide lobes 3 and 4, provides the top of the hull with a smooth curved convex surface. The inflated air vehicle hull is of a flattened form and has a generally aerodynamic shape which is able to provide aerodynamic lift to the air vehicle. Typically, with the design illustrated, approximately one-quarter to one half of the vehicle lift is provided aerodynamically through its lifting body shape and approximately one half to three-quarters of the vehicle lift in provided by the buoyancy of the hull gas, e.g. helium. In longitudinal section, the hull has a generally greater convexity on the top side than on the underside.

The underside of the air vehicle 1 includes a longitudinally extending payload module 10 positioned in the recess 9 and air cushion landing gear units 11 and 12 on the hull lobes 3 and 4, respectively. The positioning of these units is facilitated by the generally flatter underside of the hull along the length of the hull, at least in a central portion of the hull where these units are located. Each of the landing gear units 11 and 12 typically comprises a flexible skirt 23 defining an air cavity 24 into which pressurized air can be blown by means 25 (shown schematically in FIG. 4) to provide an air cushion for supporting the air vehicle during landing, taking-off and taxiing procedures. The means 25 may also rapidly exhaust air from the air cavity so that a suction or hold-down force is applied to hold the air vehicle down in position on the ground. The relatively widely spaced apart air cushion landing gear units, combined with the low height of the hull compared with its length, give the vehicle a high degree of stability when landed enabling elaborate tie-down systems to be dispensed with (although less elaborate tie-down systems may be required in addition to the suck-down air cushion landing gear units).

A particular advantage of the use of air cushion landing gear units is that the air vehicle can land and take-off from any reasonably flat surface, including unimproved raw land, swamps, marshland and water, e.g. sea. A special runway is not required as with aircraft having wheeled undercarriages. Furthermore cross-wind landing gear drag is reduced or eliminated. The landing gear units 11 and 12 are positioned widely apart to provide the air vehicle with stability during landing and take-off.

The top lobe 5 does not extend fully to the rear of the air vehicle. Thus the rear end of the air vehicle is formed by the spaced apart ends of the two side lobes 3 and 4. Motors 13 and 14 are mounted at the stern of the lobes 3 and 4, respectively, and these motors may be mounted to swivel to provide both vertical and horizontal vectoring. Additional motors 15 and 16 are mounted on each side of the hull and are also preferably mounted to swivel to provide vertical and horizontal vectoring. The use of vectored thrust engines positioned to allow vertical thrust vectors to act through the centers of gravity and pressure of the hull, enables vertical landing and takeoff of the air vehicle.

Towards the rear end of the hull, four angled stabilising fins 17–20 are arranged.

Although not shown, catenary webs are provided for carrying loads between the floor of the payload module 10 and the outer shell of the hull.

In use when the air vehicle lands and the air within the air cavities is released and suction applied to hold the air vehicle down, the air vehicle will settle down gently bringing the payload module 10 close to the ground. The module suitably has a let down ramp (not shown) to allow wheeled vehicles to drive into and off from the payload module in the manner of a roll on/roll off container ship or the like. The low hull height relative to length, coupled with suction provided by the air cushion lading gear units, give the air vehicle a high degree of stability on ground and ease of ground handling.

The air vehicle is designed to be able to transport large loads safely over long distances. By way of example, the air vehicle described and illustrated typically has a length of 307 m, a height of 77 m and a width of 136 m. Such an air vehicle has a hull envelope volume of 2,000,000 m$^3$, a range of 4,000 nautical miles and a flying altitude of up to 9,000 feet. The air vehicle typically has a cruise speed of 100 KTAS and a maximum speed of 110 KTAS. The payload is 1,000,000 kg with a deck space 80 m long, 12 m wide and 8 m high. Smaller versions can be constructed, for example down to payloads of less than one tonne.

While the invention has been illustrated and described as embodied in a hybrid air vehicle, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A hybrid air vehicle adapted to land on, take off from and taxi along a landing surface, said vehicle having a gas-filled contoured flattened hull including a pair of longitudinally extending side lobes defining, on the underside of the hull, a longitudinally extending central recess, a payload module received in said central recess and air cushion landing gear units on the underside of said side lobes of the hull, the landing gear units being spaced from the payload module on opposite sides thereof, and combining to provide separated air cushions for supporting the air vehicle above the landing surface during landing, taking off and taxiing procedures, wherein said longitudinal central recess extends at least for the length of the payload module and the payload module is substantially fully contained within the recess.

2. An air vehicle according to claim 1, wherein the said hull is non-rigid and is made of flexible sheet material.

3. An air vehicle according to claim 1, wherein the hull includes a longitudinally extending top lobe arranged between the side lobes at the top of the hull.

4. An air vehicle according to claim 3, wherein the hull has an outer envelope and a pair of internal longitudinally extending partition means which converge downwardly towards each other, the space between the partition means and the outer envelope defining said top lobe and the spaces outwardly of the partition means defining said side lobes.

5. An air vehicle according to claim 1, wherein said hull lobes are gas-filled and are isolated from each other.

6. An air vehicle according to claim 1, wherein the two side hull lobes extend separately at the rear of the air vehicle and are provided with stern mounted drive motors.

7. An air vehicle according to claim 1, wherein motor means are provided on each side of the hull.

8. An air vehicle according to claim 1, wherein each air cushion landing gear unit comprises flexible curtain means surrounding an air cushion cavity and air means for supplying compressed air to the air cushion cavity to provide a cushion of air for supporting the air vehicle during landing and take-off.

9. An air vehicle according to claim 8, wherein each air cushion landing gear unit includes means for rapidly exhausting air from the air cushion cavity to provide a hold-down force for holding the air vehicle in position on the landing surface.

10. An air vehicle according to claim 1, wherein the hull is provided with tail fins.

11. An air vehicle according to claim 10, wherein there are four tail fins each disposed at an angle to a vertical plane.

12. An air vehicle according to claim 1, wherein the hull has a camber along its length.

13. An air vehicle according to claim 1, wherein each of said air cushion landing gear units comprises an elongated air cushion cavity extending along the length of the underside of its associated lobe.

* * * * *